United States Patent
Bennett

(10) Patent No.: US 9,746,020 B1
(45) Date of Patent: Aug. 29, 2017

(54) JAM NUT LOCK FOR ROD ENDS AND THE LIKE

(71) Applicant: Bruce A. Bennett, San Rafael, CA (US)

(72) Inventor: Bruce A. Bennett, San Rafael, CA (US)

( * ) Notice: Subject to any disclaimer, the term of this patent is extended or adjusted under 35 U.S.C. 154(b) by 0 days.

(21) Appl. No.: 15/297,873

(22) Filed: Oct. 19, 2016

(51) Int. Cl.
*F16B 39/12* (2006.01)
*F16B 39/08* (2006.01)

(52) U.S. Cl.
CPC .............. *F16B 39/08* (2013.01); *F16B 39/12* (2013.01)

(58) Field of Classification Search
CPC .................................. F16B 39/08; F16B 39/12
USPC ................. 411/204, 214, 222, 223, 226, 235
See application file for complete search history.

(56) References Cited

U.S. PATENT DOCUMENTS

| | | | | |
|---|---|---|---|---|
| 661,655 A * | 11/1900 | Bryce | ...................... | F16B 39/36 411/222 |
| 796,900 A * | 8/1905 | Cull | ........................ | F16B 39/12 411/222 |
| 916,298 A * | 3/1909 | Gifford | .................... | F16B 39/12 411/222 |
| 1,372,525 A * | 3/1921 | McCabe | .................. | F16B 39/36 411/237 |
| 1,866,067 A * | 7/1932 | Strober | ..................... | F16B 2/20 411/190 |
| 1,943,672 A * | 1/1934 | Hewitt | ..................... | F16B 39/12 411/237 |
| 2,407,928 A * | 9/1946 | Herreshoff | .............. | F16B 39/08 29/888.09 |
| 2,707,508 A * | 5/1955 | Durst | ...................... | F16B 39/02 301/65 |
| 3,225,809 A * | 12/1965 | Peak, Sr. | ................. | F16B 39/36 411/223 |
| 5,582,496 A * | 12/1996 | Ambrico | .................. | F16B 39/12 411/243 |
| 7,841,251 B2 * | 11/2010 | Bogue | ..................... | F16B 37/00 74/89.42 |
| 2005/0025607 A1 * | 2/2005 | Guantonio | .............. | F16B 39/12 411/222 |
| 2007/0258789 A1 * | 11/2007 | Bogue | ..................... | F16B 37/00 411/240 |

* cited by examiner

*Primary Examiner* — Roberta Delisle
(74) *Attorney, Agent, or Firm* — Edward S. Wright

(57) ABSTRACT

Lock mechanism for preventing unwanted rotation of a jam nut on a threaded connection between a rod end and a connecting rod. The mechanism includes a lock collar which can be moved axially of the rod end and the connecting rod between a retracted position out of contact with the jam nut and a locking position in which the collar engages the jam nut and prevents the jam nut from turning, and a retainer for keeping the lock collar in the locking position.

19 Claims, 4 Drawing Sheets

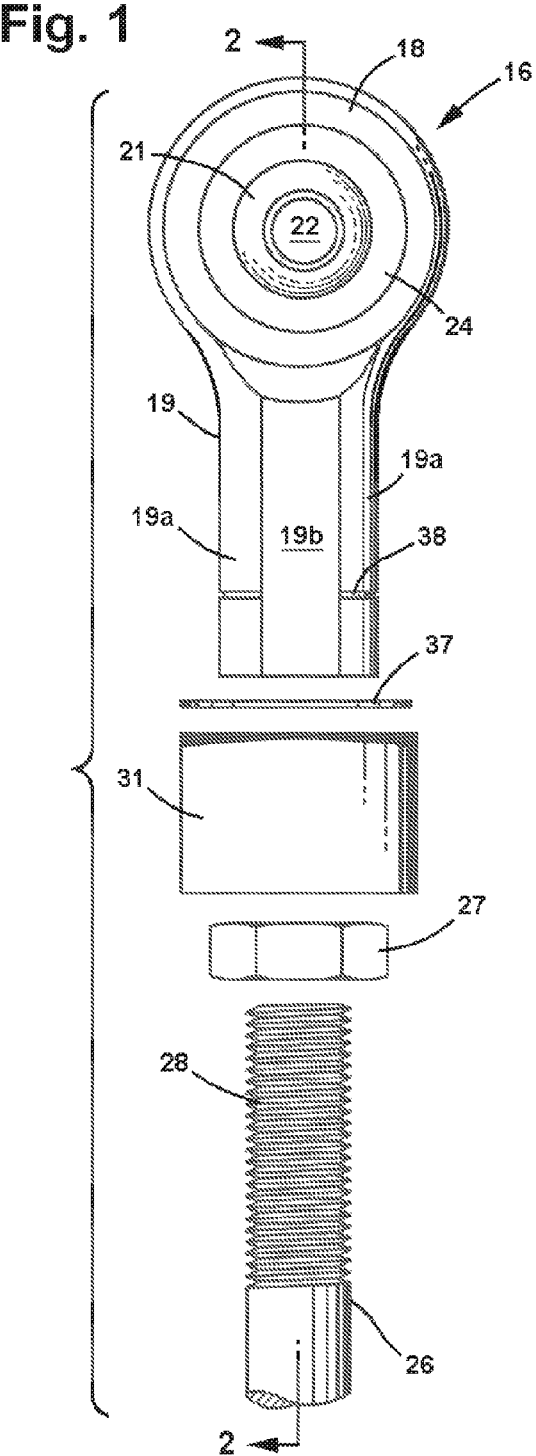
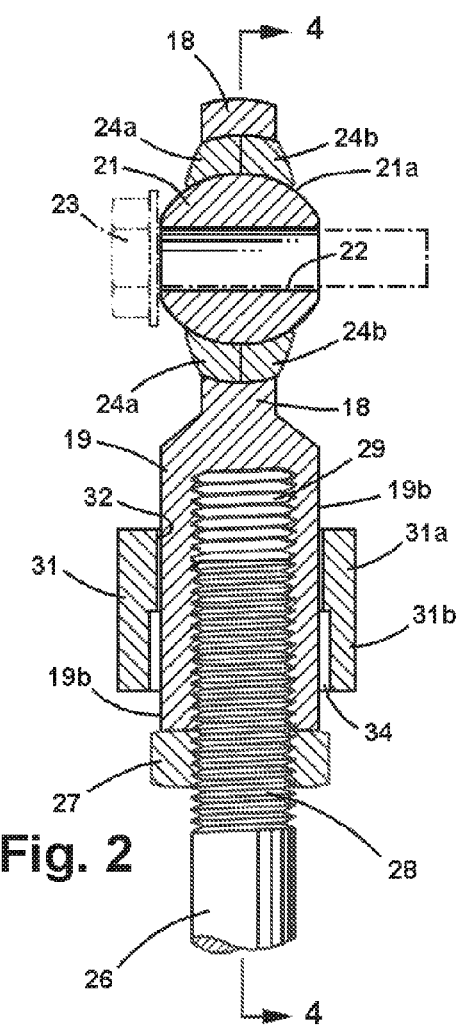
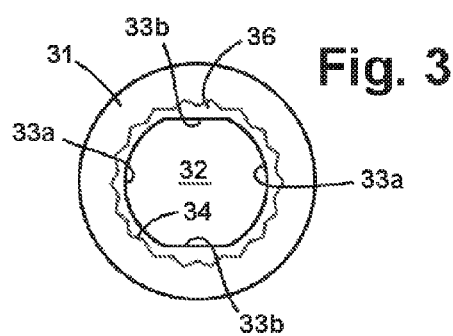
Fig. 1
Fig. 2
Fig. 3

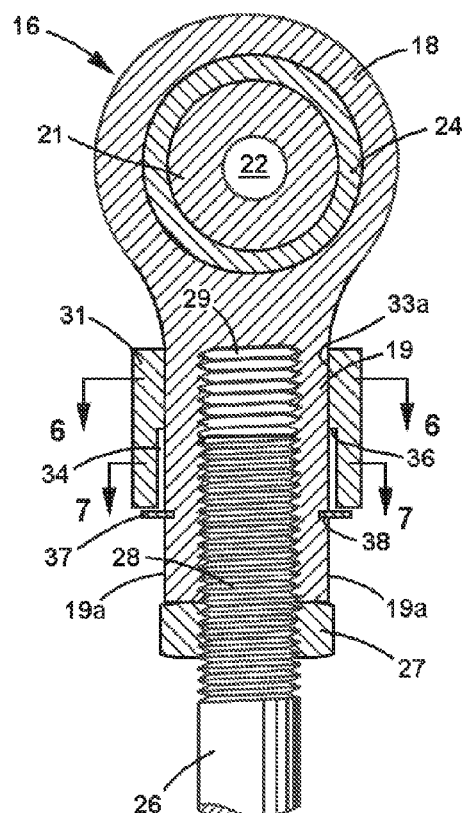
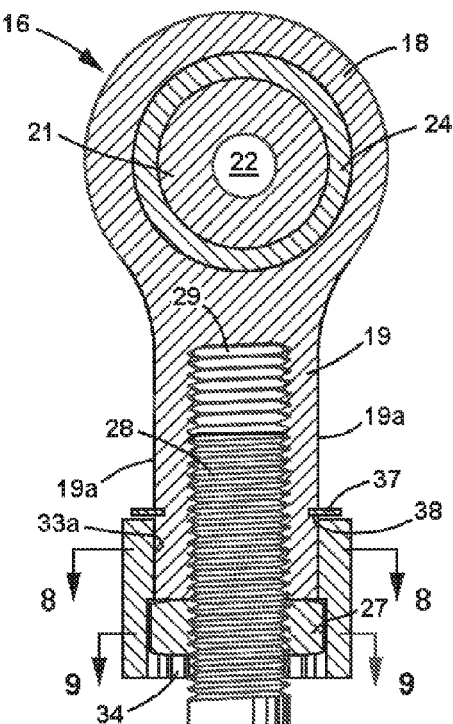
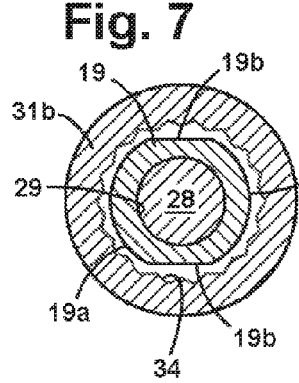
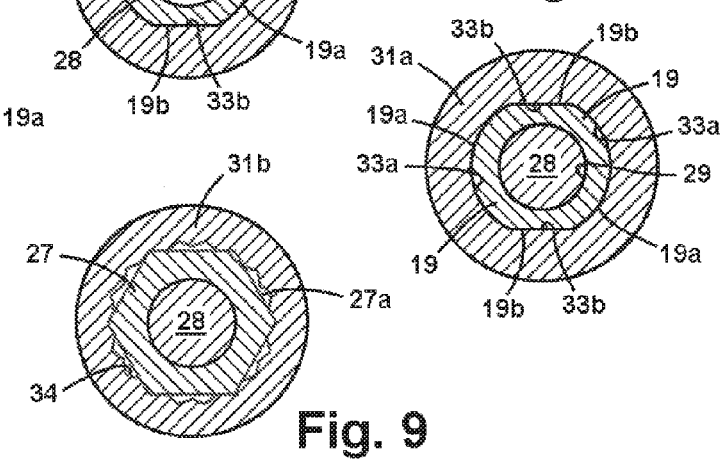

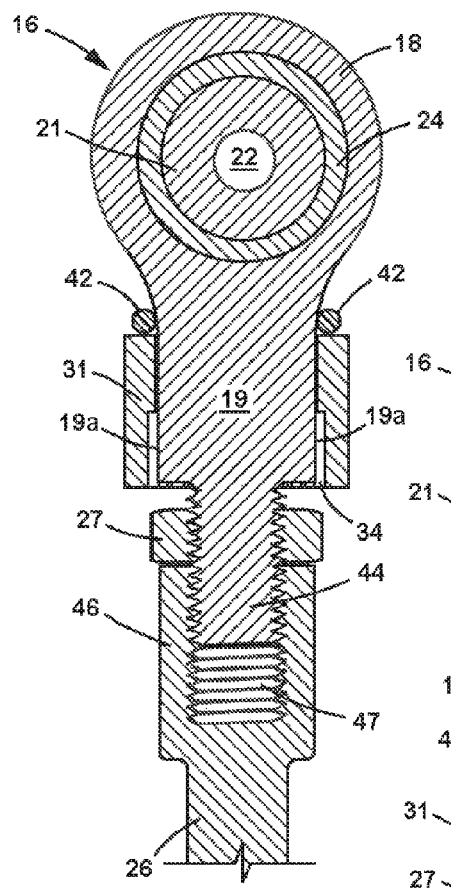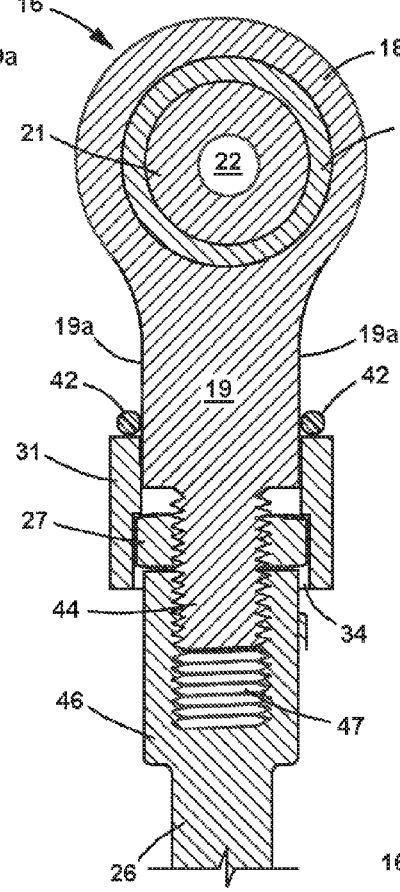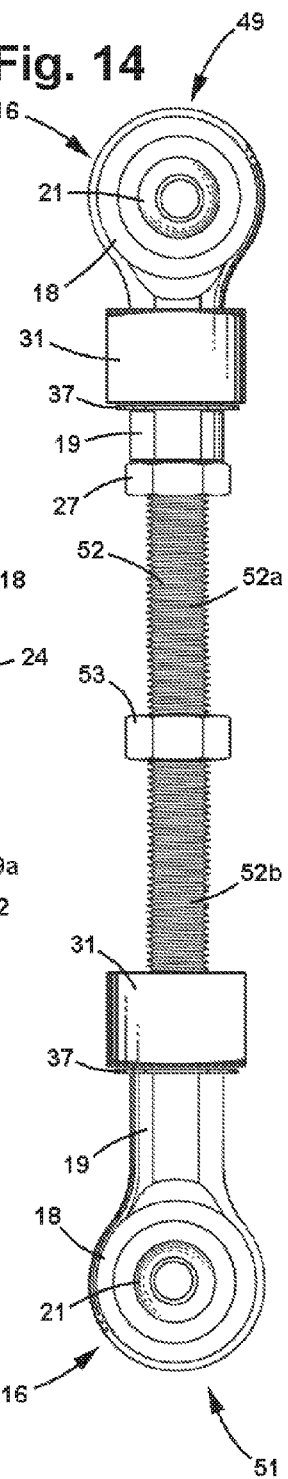

JAM NUT LOCK FOR ROD ENDS AND THE LIKE

BACKGROUND OF THE INVENTION

Field of Invention

This invention pertains generally to rod ends and other articulating mechanical joints and, more particularly, to a lock mechanism for preventing unwanted rotation of jam nuts used on rod ends and other articulating mechanical joints.

Related Art

Rod ends or Heim joints are often used on the ends of control rods, steering links, tie rods, and in other applications where precision articulating joints are required. They are used in the suspension systems of race cars and off-road vehicles because of their flexibility, ruggedness, and ability to locate wheels very precisely. These rod ends typically have a ball swivel rotatively mounted in a housing for attachment to other components and a threaded shank which extends from the housing and is attached to a connecting rod or link.

The threaded connections between the connecting rods and shanks are commonly provided with jam nuts which are intended to lock the rods and shanks together and prevent unwanted rotation between them. However, when the rod ends or heim joints are subjected to vibrations such as those occurring in race cars and off-road vehicles, the jam nuts can work loose, allowing unwanted rotation between the rods and shanks which throws off the alignment between the parts to which the joints are connected.

OBJECTS AND SUMMARY OF THE INVENTION

It is, in general, an object of the invention to provide a new and improved lock mechanism for preventing unwanted rotation of jam nuts used on rod ends and other articulating mechanical joints.

Another object of the invention is to provide a lock mechanism of the above character which overcomes the limitations and disadvantages of the prior art.

These and other objects are achieved in accordance with the invention by providing a lock mechanism for preventing unwanted rotation of a jam nut on a threaded connection between a rod end and a connecting rod. The mechanism includes a lock collar which can be moved axially of the rod end and the connecting rod between a retracted position out of contact with the jam nut and a locking position in which the collar engages the jam nut and prevents the jam nut from turning, and means for retaining the lock collar in the locking position.

BRIEF DESCRIPTION OF THE DRAWINGS

FIG. 1 is an exploded front elevational view of one embodiment of a lock mechanism for preventing unwanted rotation of a jam nut on a rod end or heim joint in accordance with the invention.

FIG. 2 is cross-sectional view taken along line 2-2 in FIG. 1, showing the rod end or heim joint assembled with the lock mechanism in an unlocked state.

FIG. 3 is an end view of a lock collar in the embodiment of FIG. 1.

FIG. 4 is a cross-sectional view taken along line 4-4 of FIG. 2.

FIG. 5 is a view similar to FIG. 4 with the lock collar in a locking position.

FIG. 6 is a cross-sectional view taken along line 6-6 of FIG. 4.

FIG. 7 is a cross-sectional view taken along line 7-7 of FIG. 4.

FIG. 8 a cross-sectional view taken along line 8-8 of FIG. 5.

FIG. 9 a cross-sectional view taken along line 9-9 of FIG. 5.

FIGS. 12 and 13 are cross-sectional views of another embodiment of a lock mechanism for preventing unwanted rotation of a jam nut on a rod end or heim joint in accordance with the invention, with the lock collar in unlocked and locking positions.

FIG. 14 is a front elevational view of an embodiment having jam nut locks incorporating the invention on rod ends or heim joints at opposite ends of a control rod.

DETAILED DESCRIPTION

Figure 10:
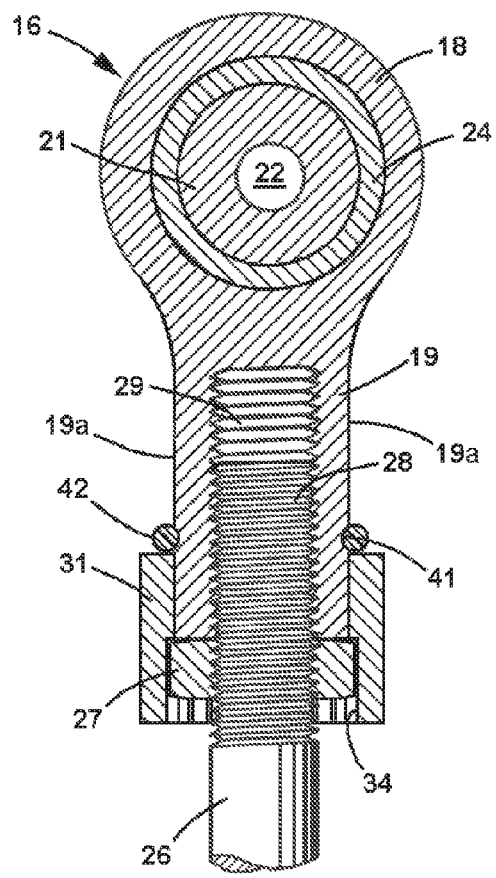
FIGS. 10 and 11 are cross-sectional views similar to FIG. 5 of additional embodiments of a lock mechanism for preventing unwanted rotation of a jam nut on a rod end or heim joint in accordance with the invention.

In FIG. 1, the invention is illustrated in conjunction with a rod end or heim joint that includes a casing or body 16 having a generally circular, ring-like head 18 formed integrally with an elongated shank 19 which extends from one side of the head. A bearing member 21 having a spherically curved bearing surface 21a is rotatively mounted in the head, with a bore 22 extending through the bearing member for receiving a mounting bolt 23 or other suitable fastener for attaching the joint to other components.

In the embodiment illustrated, the ball-like bearing member is mounted in a bushing 24 which is formed of a material such as brass that is softer than the bearing member and head which are typically made of steel. The bushing is formed in two pieces 24a, 24b which are placed on opposite sides of the head and pressed together into conformance with the spherical bearing surface and the inner wall 18a of the head, as described in greater detail in U.S. Pat. No. 2,366,668.

A connecting rod 26 is threadedly connected to the shank portion of housing 16, with a jam nut 27 engagable between the rod and the shank for locking the two together in a fixed position. In this particular embodiment, the rod has an externally threaded end portion 28, and the shank has an internally threaded axial bore 29 in which the externally threaded portion is received. Jam nut 27 is mounted on the threaded portion of the rod and is tightened against the outer end of the shank to lock the rod and shank together in a fixed position. If desired, the exterior or male thread can be on the shank, with the interior or female thread in the rod.

A lock collar 31 is slidably mounted on shank 19 for movement axially of the connecting rod and shank between a retracted position out of contact with jam nut 27 and a locking position in which the collar engages the jam nut and prevents it from turning.

Shank 19 and jam nut 27 each have a noncircular peripheral contour, and collar 31 has a first end section 31a with an internal contour corresponding to the peripheral contour of the shank and a second end section 31b with an internal contour corresponding to the peripheral contour of the jam nut. As best seen in FIGS. 1 and 6, the shank has a cylindrical outer wall with two arcuately curved sections 19a, 19a and two parallel planar surfaces 19b, 19b between the curved sections on opposite sides of the shank, and the first end section of the collar has an opening 32 with an inner side wall 33 having a pair of arcuately curved sections 33a, 33a with flat sections 33b, 33b between the curved sections on opposite sides of the collar.

Jam nut 27 has a polygonal body 27a, and the second end portion of the collar comprises a multi-point socket 34 which is engagable with the jam nut in a plurality of different rotational positions. In the embodiment illustrated, the jam nut has a hexagonal or 6-sided body, and socket 34 is an 18-point socket. However, these numbers are exemplary, and the nut and the socket can have any number of sides and points desired.

As best seen in FIG. 3, socket 34 is of somewhat greater diameter than opening 32, and an axially facing, generally annular shoulder 36 is formed between the two sections. When the collar is in its locking position, this shoulder abuts against the surface of the jam nut facing the shank and prevents the collar from sliding past the nut.

Means is provided for retaining the collar in the locking position. In the embodiment of FIGS. 1-2, this means comprises a C-shaped lock ring or snap ring 37 which is installed in a circumferentially extending groove 38 in the outer surface of shank 19 and serves as a limiting abutment that prevents the collar from sliding back from the jam nut.

In FIGS. 2 and 4, lock collar 31 is shown in an unlocked or retracted position, with socket 34 disengaged from jam nut 27 and the jam nut being free to turn in either direction. As seen in FIGS. 6 and 7, the walls of opening 32 remain in sliding engagement with shank 19 while preventing the collar from turning on the shank, and with socket 34 being of larger diameter than the opening, the walls of the socket remain out of contact the shank.

If desired, lock ring 37 can also be used for retaining collar 31 in an unlocked or retracted position by installing the lock ring on the front side of the collar while the collar is in the unlocked or retracted position. As shown in FIGS. 2 and 4, the collar is pulled back near head 18, and lock ring 37 is inserted into groove 38 in front of the collar to prevent the collar from sliding forward and interfering with the turning of the jam nut.

In FIGS. 5 and 8, lock collar 31 is shown in the locking position, with the walls of socket 31 engaging the corners of jam nut 27 and preventing the jam nut from turning within the socket, and the mating noncircular walls of opening 32 and shank 19 preventing the collar from turning on the shank. The collar is retained in the locking position by lock ring 37 and by the jam nut itself. As can be seen in FIG. 5, the lock ring serves as a limiting abutment for the rear side of the collar, and when engaged by shoulder 36, jam nut 27 prevents forward movement of the collar. With the collar thus captured between the lock ring and the jam nut, it remains in the locking position.

Figure 11:
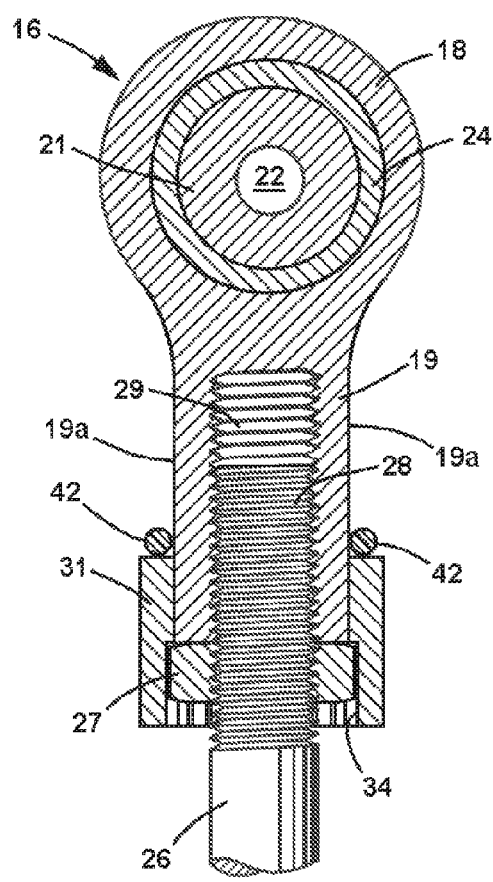

Although the figures discussed to this point show the use of a C-ring or snap ring as a stop for limiting movement of the lock collar, other types of stop members can be utilized, if desired, and FIGS. 10 and 11 illustrate the use of O-rings for this purpose. In the embodiment of FIG. 9, an O-ring groove 41 is formed in the curved surfaces of shank 19, and a resilient O-ring 42 is removably installed in this groove to serve as a limiting abutment for the collar. In this particular figure, the collar is shown in the locking position, with the O-ring on the rear side of the collar, but the O-ring can also be placed in front of the collar to retain the collar in an unlocked or retracted position, if desired.

The embodiment of FIG. 11 is similar to the embodiment of FIG. 10 except there is no groove for the O-ring. Instead, the O-ring is mounted on the outer surface of the shank and is held in position on the shank by the resilient forces of the O-ring and friction between the O-ring and shank.

FIGS. 12 and 13 illustrate an embodiment in which the external or male threads are formed on the shank and the internal or female threads are formed in the connecting rod. This embodiment is otherwise similar to the embodiments discussed above, and like reference numerals designate corresponding elements in them. In the embodiment of FIGS. 12 and 13, the outer end portion of shank 19 consists of an externally threaded stem 44, and the connecting rod has an enlarged end portion 46 with an internally threaded bore 47 in which the stem is threadedly received.

With lock collar 31 retracted, as shown in FIG. 12, the connecting rod and shank are threaded together to a desired position, then locked in that position by tightening jam nut 27 against the end of the enlarged end portion of the connecting rod. The lock collar is then slid along the shank to the locking position with socket 31 engaging the jam nut to prevent it from turning. O-ring 42 is then slid along the shank and into engagement the rear side of the collar to keep the collar in the locking position.

FIG. 14 illustrates the use of the invention in conjunction with a rod end or heim joint assembly in which two rod ends or heim joints 49, 51 are linked together by a connecting rod or link 52. The rod ends or heim joints are illustrated as being of the type shown in FIGS. 1-8, with each of them having a casing or body 16 with a head 18 and an internally threaded shank 19, a spherical bearing member 21 rotatively mounted in the head, a jam nut 27, a lock collar 31 mounted on the shank for movement between unlocked and locking positions, and a lock ring 37 for retaining the collar in the locking position. A hexagonal drive lug 53 is affixed to the connecting rod or link for engagement by a wrench for turning the rod as a unitary structure.

The two shanks are threaded in opposite directions, as are the end portions 52a, 52b of link 52, so that rotation of the link in one direction draws the two shanks together and rotation in the other direction moves them apart. When the shanks are in the desired position, the jam nuts, which are threadedly mounted on the threaded end portions of the link, are tightened against the ends of the shanks to lock the shanks and the links together with the shanks in the desired position. Lock collars 31 are then slid along the shanks to their locking positions with the sockets 32 in locking engagement with jam nuts 27, and lock rings 37 are installed in their grooves to retain the collars in the locking positions.

It is apparent from the foregoing that a new and improved lock mechanism for preventing unwanted rotation of jam nuts used on rod ends and other articulating mechanical joints has been provided. While only certain presently preferred embodiments have been described in detail, as will be apparent to those familiar with the art, certain changes and modifications can be made without departing from the scope of the invention as defined by the following claims.

The invention claimed is:

1. A lock mechanism for preventing unwanted rotation of a jam nut on a threaded connection between a rod end and a connecting rod, comprising a lock collar which is slidably and non-rotatably mounted on the rod end and the connecting rod for movement between a retracted position out of contact with the jam nut and a locking position in which the collar peripherally engages the jam nut and prevents the jam nut from turning.

2. The lock mechanism of claim 1 wherein the rod end has an axially extending internally threaded bore, the connecting rod has an externally threaded end portion which is threadedly received in the internally threaded bore, and the jam nut is mounted on the externally threaded end portion of the connecting rod in abutting engagement with rod end.

3. The lock mechanism of claim 1 wherein the rod end has an axially extending externally threaded end portion, the connecting rod has an internally threaded end portion in which the externally threaded end portion of the rod end is threadedly received, and the jam nut is mounted on the externally threaded end portion of the rod end in abutting engagement with connecting rod.

4. The lock mechanism of claim 1 wherein the rod end and the jam nut each have a noncircular peripheral contour, and the collar has a first end section with an internal contour corresponding to the peripheral contour of the rod end and a second end section with an internal contour corresponding to the peripheral contour of the jam nut.

5. The lock mechanism of claim 4 wherein the rod end has a cylindrical outer periphery with parallel planar surfaces on opposite sides thereof.

6. The lock mechanism of claim 4 wherein the jam nut has a polygonal body, and the second end portion of the collar comprises a multi-point socket which is engagable with the jam nut in a plurality of different rotational positions.

7. The lock mechanism of claim 1 including means for retaining the lock collar in the locking position.

8. The lock mechanism of claim 7 wherein the means for retaining the lock collar in the locking position includes a stop member removably mounted on the rod end adjacent to the collar.

9. The lock mechanism of claim 8 wherein the stop member is mounted in a peripherally extending groove in the rod end.

10. The lock mechanism of claim 8 wherein the stop member comprises an O-ring.

11. The lock mechanism of claim 8 wherein the stop member comprises a snap ring.

12. A lock mechanism for preventing unwanted rotation of a jam nut that is mounted on an externally threaded end portion of a connecting rod and abuts against a rod end having an internally threaded bore in which the end portion of the connecting rod is threadedly received, the lock mechanism comprising a lock collar which is slidably mounted on and constrained against rotation relative to the rod end for movement between a retracted position out of contact with the jam nut and a locking position in which the collar peripherally engages the jam nut and prevents the jam nut from turning, and a retainer for keeping the lock collar in the locking position.

13. The lock mechanism of claim 12 wherein the rod end and the jam nut each have a noncircular peripheral contour, and the collar has a first end section with an internal contour corresponding to the peripheral contour of the rod end and a second end section with an internal contour corresponding to the peripheral contour of the jam nut.

14. The lock mechanism of claim 13 wherein the rod end has a cylindrical outer periphery with parallel planar surfaces on opposite sides thereof.

15. The lock mechanism of claim 13 wherein the jam nut has a polygonal body, and the second end portion of the collar comprises a multi-point socket which is engagable with the jam nut in a plurality of different rotational positions.

16. A lock mechanism for preventing unwanted rotation of a jam nut that is mounted on an externally threaded end portion of a rod end and abuts against a connecting rod having an internally threaded bore in which the end portion of the rod end is threadedly received, the lock mechanism comprising a lock collar which is slidably mounted on and constrained against rotation relative to the rod end for movement between a retracted position out of contact with the jam nut and a locking position in which the collar peripherally engages the jam nut and prevents the jam nut from turning, and a retainer for keeping the lock collar in the locking position.

17. The lock mechanism of claim 16 wherein the rod end and the jam nut each have a noncircular peripheral contour, and the collar has a first end section with an internal contour corresponding to the peripheral contour of the rod end and a second end section with an internal contour corresponding to the peripheral contour of the jam nut.

18. The lock mechanism of claim 17 wherein the rod end has a cylindrical outer periphery with parallel planar surfaces on opposite sides thereof.

19. The lock mechanism of claim 17 wherein the jam nut has a polygonal body, and the second end portion of the collar comprises a multi-point socket which is engagable with the jam nut in a plurality of different rotational positions.

* * * * *